United States Patent
Dinan et al.

(10) Patent No.: US 8,520,646 B1
(45) Date of Patent: Aug. 27, 2013

(54) RANGING OF WIRELESS COMMUNICATION NETWORKS WITH DISTANT LINKS

(75) Inventors: Esmail Hejazi Dinan, Herndon, VA (US); Saied Kazeminejad, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 889 days.

(21) Appl. No.: 12/180,036

(22) Filed: Jul. 25, 2008

(51) Int. Cl.
*H04W 4/00* (2009.01)
*H04W 84/12* (2009.01)
*H04W 84/18* (2009.01)

(52) U.S. Cl.
CPC .............. *H04W 84/12* (2013.01); *H04W 84/18* (2013.01)
USPC ............ 370/338; 370/315; 455/522; 455/561

(58) Field of Classification Search
USPC .................. 370/338, 315; 455/456, 522, 561
See application file for complete search history.

(56) References Cited

U.S. PATENT DOCUMENTS

| | | | |
|---|---|---|---|
| 6,038,450 A | 3/2000 | Brink et al. | |
| 2002/0098839 A1* | 7/2002 | Ogino et al. | 455/424 |
| 2002/0115448 A1* | 8/2002 | Amerga et al. | 455/456 |
| 2002/0184391 A1* | 12/2002 | Phillips | 709/248 |
| 2007/0133460 A1 | 6/2007 | Sohn et al. | |
| 2007/0147278 A1* | 6/2007 | Millar | 370/315 |
| 2009/0046586 A1* | 2/2009 | Stuart et al. | 370/236 |

* cited by examiner

*Primary Examiner* — Pao Sinkantarakorn
*Assistant Examiner* — Richard K Chang
(74) *Attorney, Agent, or Firm* — O'Brien Jones, PLLC

(57) ABSTRACT

A method of operating a communication system is disclosed. The method includes exchanging a first communications between an access node and an antenna node over a first link and processing the first communications to determine a first delay metric, wherein the first delay metric indicates a first time delay associated with the first link. The method also includes exchanging a second communications between the access node and a wireless communication device over a third link, wherein the third link comprises the first link and a second link between the antenna node and the wireless communication device and processing the second communications to determine a second delay metric, wherein the second delay metric indicates a second time delay associated with the third link. The method also includes processing the first delay metric and the second delay metric to determine a third delay metric and timing a third communications between the access node and the wireless communication device over the third link based on the third delay metric.

17 Claims, 7 Drawing Sheets

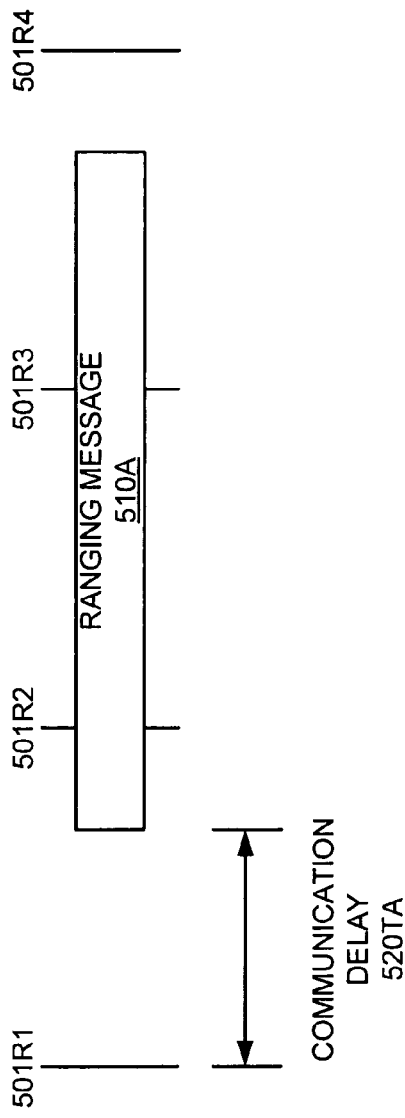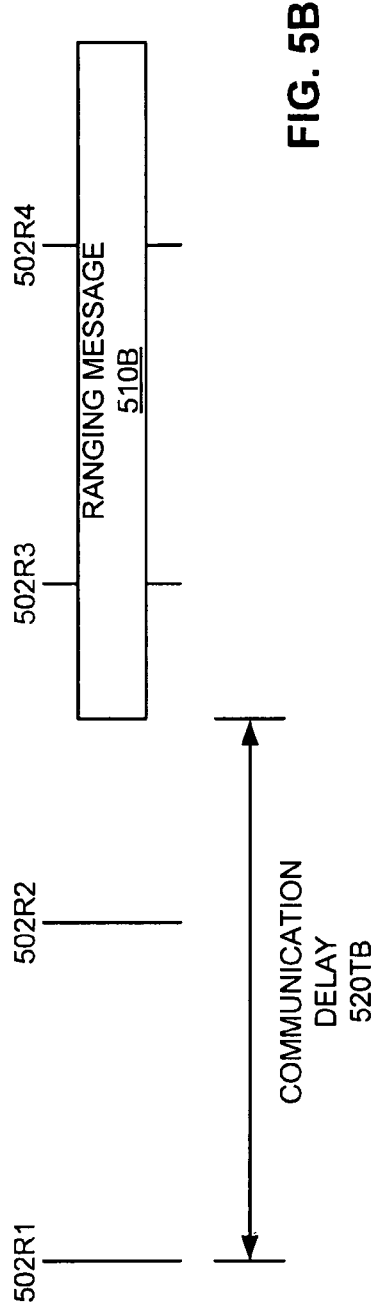

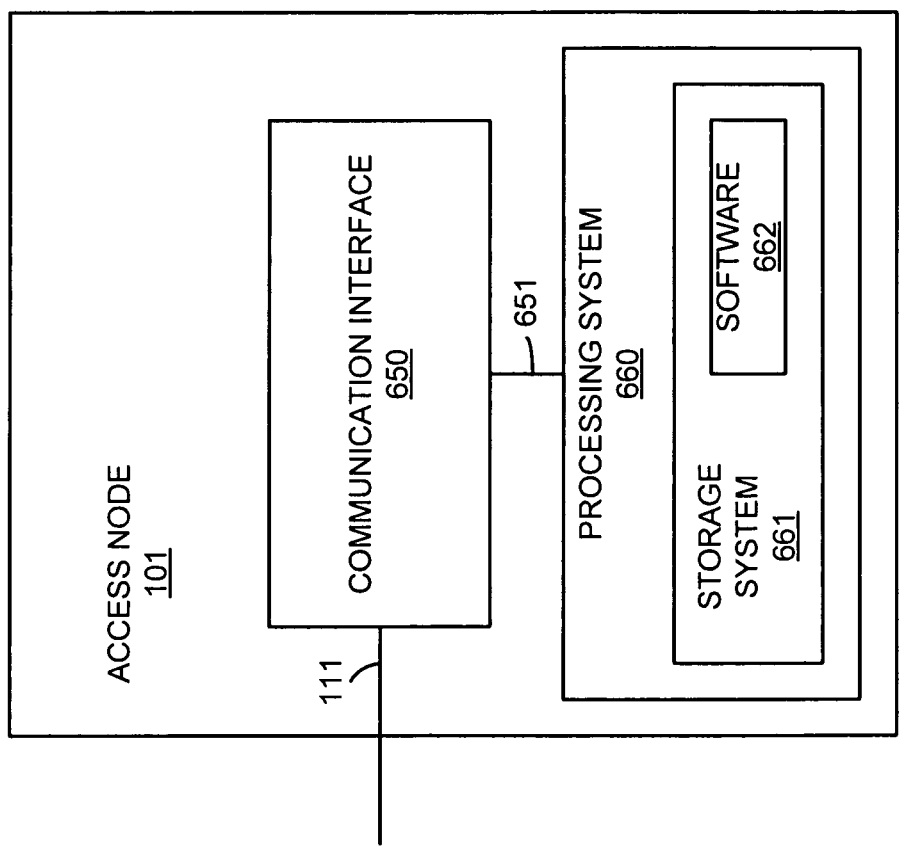

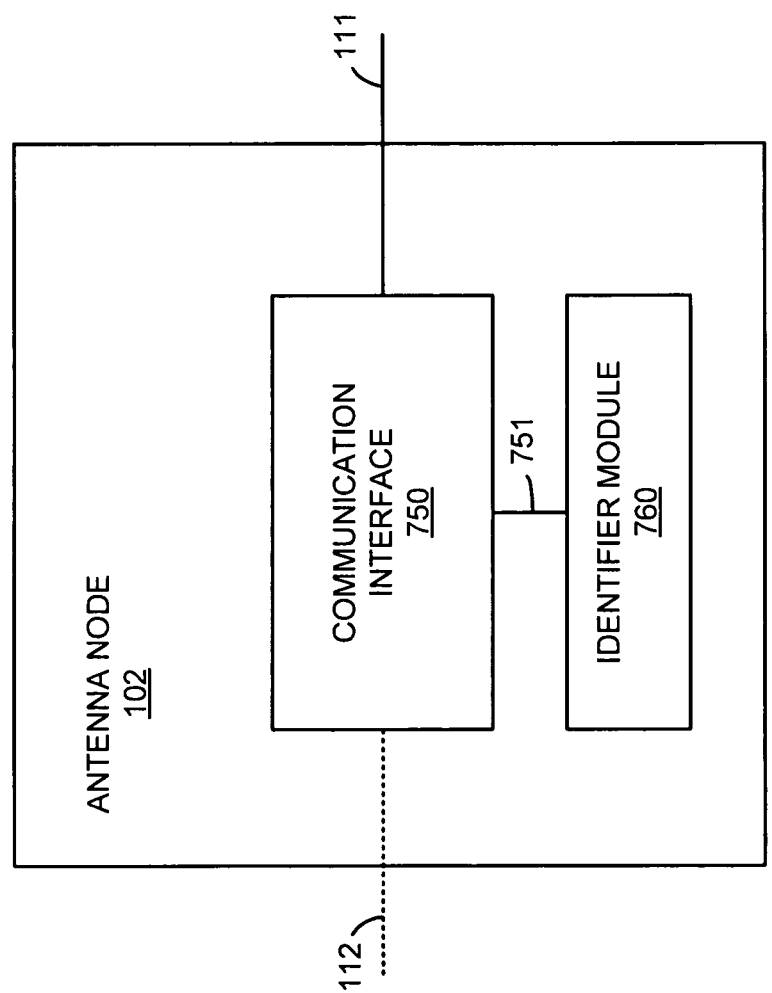

RANGING OF WIRELESS COMMUNICATION NETWORKS WITH DISTANT LINKS

TECHNICAL BACKGROUND

Wireless communication networks typically include wireless communication devices which, via a communication system, communicate with further communication networks and equipment. The communication system typically includes antennas, base stations, and other associated equipment to route communications over wireless links from the wireless communication devices to further communication networks, equipment, and destinations.

However, in some wireless communication networks, the antennas are located distant from the base stations. Some examples of these wireless communication networks include distributed antenna systems (DAS). A distributed antenna system (DAS) includes communication systems where the base transceiver station or access node equipment is located separately and distant from, and is coupled with, multiple antenna nodes serving a geographic area. In many of these examples, the base station equipment communicates over extended distances to many separate antenna elements capable of communicating with wireless communication devices over wireless links.

In such networks, long cable or optical connections can exist between the antenna equipment and the base station equipment, leading to longer-than-anticipated communication transmission delays. These delays can cause problems with existing communication equipment and protocols, leading to interference, collisions, or other malfunctions of wireless communications through the wireless communication networks.

Overview

Disclosed is a method of operating a communication system which includes exchanging a first communications between an access node and an antenna node over a first link and processing the first communications to determine a first delay metric, wherein the first delay metric indicates a first time delay associated with the first link. The method also includes exchanging a second communications between the access node and a wireless communication device over a third link, wherein the third link comprises the first link and a second link between the antenna node and the wireless communication device and processing the second communications to determine a second delay metric, wherein the second delay metric indicates a second time delay associated with the third link. The method also includes processing the first delay metric and the second delay metric to determine a third delay metric and timing a third communications between the access node and the wireless communication device over the third link based on the third delay metric.

Also disclosed is a communication system which includes an access node configured to exchange a first communications with an antenna node over a first link and process the first communications to determine a first delay metric, wherein the first delay metric indicates a first time delay associated with the first link. The access node is also configured to exchange a second communications with a wireless communication device over a third link, wherein the third link comprises the first link and a second link between the antenna node and the wireless communication device, process the second communications to determine a second delay metric, wherein the second delay metric indicates a second time delay associated with the third link, and process the first delay metric and the second delay metric to determine a third delay metric. The access node is further configured to time a third communications with the wireless communication device over the third link based on the third delay metric.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 5A and 5B are graphical representations of ranging packets in a communication system.

FIG. 6 is a block diagram illustrating an access node.

FIG. 7 is a block diagram illustrating an antenna node.

DETAILED DESCRIPTION

Figure 1:
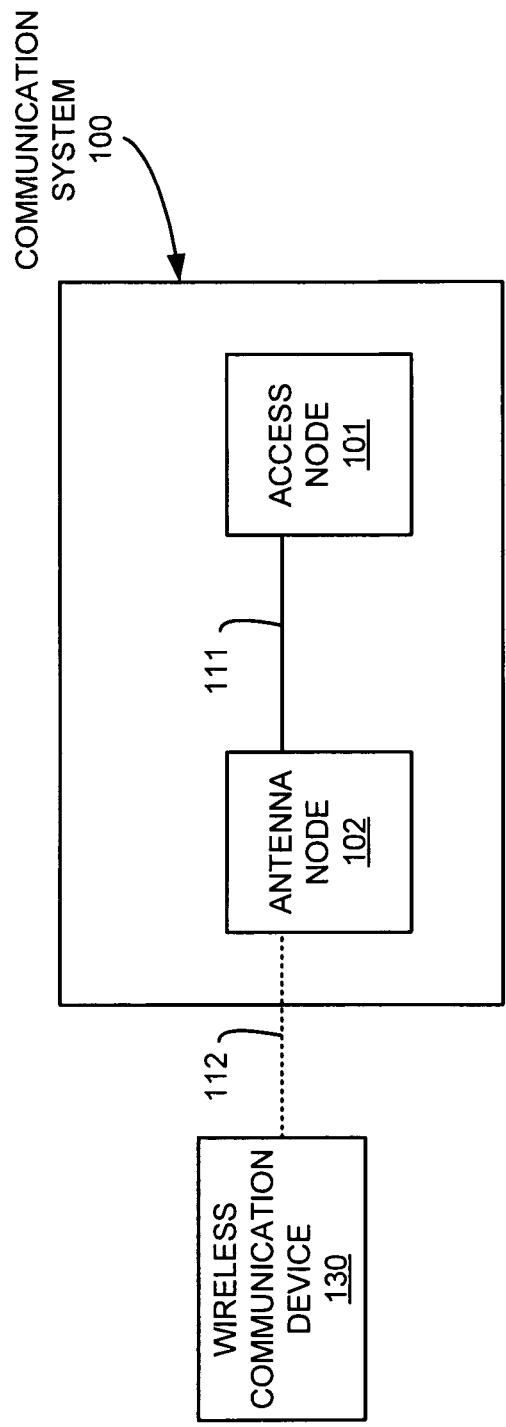
FIG. 1 is a system diagram illustrating a communication system.

FIG. 1 is a system diagram illustrating communication system 100. FIG. 1 includes access node 101, antenna node 102, and wireless communication device 130. Access node 101 and antenna node 102 communicate over link 111. Antenna node 102 and wireless communication device 130 communicate over wireless link 112.

Access node 101 includes communication and processing equipment to communicate with and control antenna node 102 as well as wireless communication device 130. Examples of access node 101 include wireless base transceiver stations (BTS), base station controllers (BSC), access service networks (ASN), radio node controllers (RNC), mobile switching centers (MSC), call processing equipment, wireless access points, telephone switches, Internet routers, and network gateways, as well as other type of communication equipment, including combinations thereof. In other examples, access node 101 includes RF-optical converters, data concentrators, multiplexers, computer systems, processing systems, or other conversion and processing equipment, including combinations thereof.

Antenna node 102 includes equipment capable of transferring communications between access node 101 and wireless communication device 130. In some examples, antenna node 102 includes an RF head of a distributed antenna system (DAS). In other examples, antenna node 102 includes antennas, RF-optical converters, filters, amplifiers, and other communication equipment, including combinations thereof.

Wireless communication device 130 includes equipment capable of communicating over wireless link 112 with communication system 100. Examples of wireless communication device 130 include a subscriber station (SS), customer premises equipment (CPE), mobile station, telephone, transceiver, computer, digital assistant, Internet appliance, or other wireless communication apparatus, including combinations thereof. Although one wireless communication device 130 is shown in FIG. 1, it should be understood that in other examples a different number of wireless communication devices could be in communication with communication system 100.

Wireless link 112 uses air, space, or some other wireless signal propagation path. Wireless link could use various protocols, such as worldwide interoperability for microwave access (WiMAX), long term evolution (LTE), time-division duplex (TDD), orthogonal frequency-division multiplexing (OFDM) or orthogonal frequency division multiplexing access (OFDMA), wireless fidelity (WiFi), code division multiple access (CDMA), time division multiple access (TDMA), global system for mobile communications (GSM), or some other communication format, including combinations or variations thereof.

Link 111 uses various communication media, such as air, space, metal, optical fiber, or some other signal propagation path—including combinations thereof. Link 111 could be wired or wireless and use various protocols, such as worldwide interoperability for microwave access (WiMAX), Long Term Evolution (LTE), time-division duplex (TDD), orthogonal frequency-division multiplexing (OFDM) or orthogonal frequency division multiplexing access (OFDMA), wireless fidelity (WiFi), code division multiple access (CDMA), time division multiple access (TDMA), Global System for Mobile communications (GSM), or some other communication format, including combinations or variations thereof.

Link 111 could be a direct link or might include various equipment, intermediate components, systems, and networks. In some examples, link 111 is an optical link.

Figure 2:
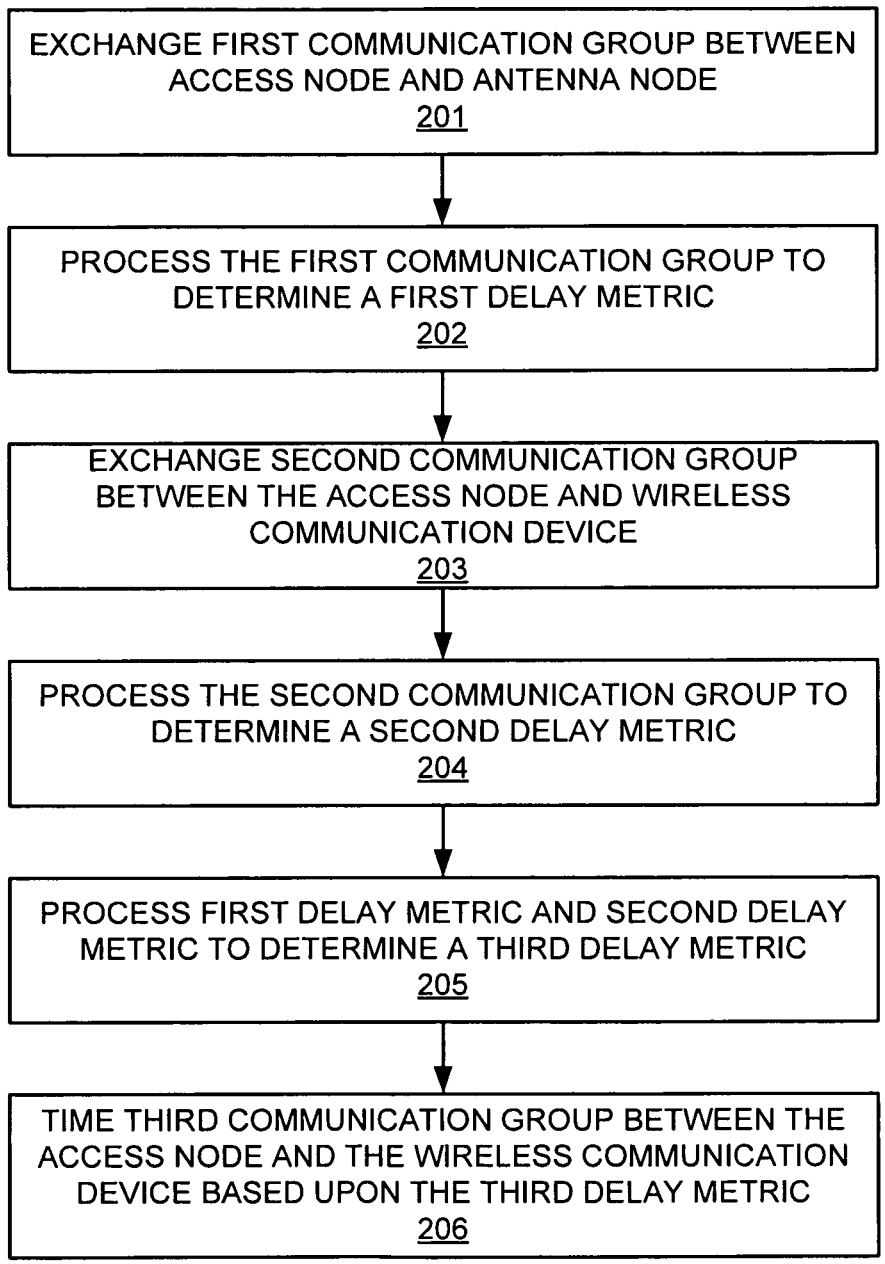
FIG. 2 is a flow diagram illustrating a method of operation of a communication system.

FIG. 2 is a flow diagram that illustrates a method of operation of communication system 100. The operations of the method shown in FIG. 2 are indicated herein parenthetically.

In FIG. 2, a first communication group is exchanged (201) between access node 101 and antenna node 102 over link 111. In some examples, a portion of the first communication group is transferred from access node 101 to antenna node 102, and another portion of the first communication group is transferred from antenna node 102 to access node 101. In other examples, the portion of the first communication group transferred from antenna node 102 to access node 101 could be triggered or initiated when the portion transferred from access node 101 is received in antenna node 102. In yet other examples, antenna node 102 processes the portion of the first communication group received from access node 101 to determine the contents or timing of the portion to transfer to access node 101.

At least a portion of the first communication group is then processed (202) by access node 101 to determine a first delay metric. The first delay metric could, for example, represent a time delay of communications transferred over link 111, and thus between access node 101 and antenna node 102. In other examples, the first delay metric could be determined by processing a round trip delay or one-way transmission delay of the first communication group between access node 101 and antenna node 102.

A second communication group is exchanged (203) between access node 101 and wireless communication device 130 over link 111 and wireless link 112. This second communication group is transferred between wireless communication device 130 and access node 101 by way of antenna node 102. In some examples, a portion of the second communication group is transferred from wireless communication device 130 to access node 101, and another portion of the second communication group is transferred from access node 101 to wireless communication device 130. Communications transferred from access node 101 to wireless communication device 130 are typically referred to as downlink communications, while communications transferred from wireless communication device 130 to access node 101 are typically referred to as uplink communications.

The second communication group could include a ranging process of a wireless link to adjust the timing, power, frequency tuning, burst profile, or other parameters of communications of communication system 100 with wireless communication device 130 over wireless link 112. This ranging process could include ranging messages or ranging channels; OFDM, OFDMA, or CDMA frames or symbols; or other communication and ranging elements.

This ranging process could be, for example, an initial ranging process, an invited ranging process, or a periodic ranging process. In examples of initial ranging, wireless communication device 130 initiates transfer of a portion of the second communication group when initializing communications with access node 101. In examples of invited ranging, a portion of the second communication group transferred from wireless communication device 130 to access node 101 could be triggered when a portion transferred from access node 101 is received at wireless communication device 130. In other examples of invited ranging, wireless communication device 130 processes a portion of the second communication group received from access node 101 to determine the content and timing of the portion transferred to access node 101. In examples of periodic ranging, the ranging process is conducted on a timed or regular basis, initiated when a portion of the second communication group is transferred to wireless communication device 130 or by way of a timing mechanism internal to access node 101 to initiate the ranging process after a certain period of time.

Access node 101 processes (204) at least a portion of the second communication group to determine a second delay metric. The second delay metric could, for example, represent a composite time delay of communications transferred over links 111 and 112 between access node 101 and wireless communication device 130. The second delay metric could be determined, for example, by processing a round trip delay or one-way transmission delay of the second communication group between access node 101 and wireless communication device 130.

Access node 101 then processes (205) the first delay metric and second delay metric to determine a third delay metric. This third delay metric may be determined from the first delay metric and second delay metric, as well as any limitations of the communication protocols utilized between access node 101 and wireless communication device 130. For example, in many communication protocols, a maximum time delay provision is allowed between two points in a communication link. This time delay provision can limit the maximum distance, interconnect quality, number of repeaters, number and delay of interconnecting equipment, or operating speed of two points in a communication link.

Regarding the timing delay provisions of some example protocols, communications between access nodes and wireless communication devices include framed communications. In WiMAX communications examples, these frames could include OFDMA symbols, which include provisions for timing offsets of symbol periods of communications with wireless communication devices. In some WiMAX examples, such as time-division duplexing (TDD), multiple wireless communication devices communicating with an access node share the same communication channel, and timing offsets play an important role in the communications. The timing offsets indicate to wireless communication devices when to transmit communications, and likewise can indicate to access nodes when to expect receipt of communications from wireless communication devices. If these timing delays are incorrect (for example when many wireless communication devices are communicating with an access node) then interferences, collisions, or other maladies of the communications could result.

Communication protocols, in some examples, accommodate only limited timing offset adjustment provisions. The provisions for timing offsets in such examples can reach a maximum allowable value if the transmission delay between an access node and a wireless communication device becomes too large. This transmission delay can become too large, for example, if there are long links, cable lengths, or wireless transmission distances over which the communications must travel.

In examples where the transmission delay becomes too large to be accommodated by the limitations of the communication protocol, the third delay metric could include both a timing offset within the individual elements of the communications as well as a delay in total communications In some examples, the timing offset of the individual elements includes a timing offset to delay transmission of portions (such as symbols or possibly frames) of the communication protocol, which could reach a maximum allowable timing offset as discussed above. The delay in total communications could include an integer number of symbols or frames by which to adjust the timing in communications. This timing adjustment could further indicate a delay in communications or a delayed receipt of communications.

Once the third delay metric has been determined, communication system 100 times (206) a third communication group between access node 101 and wireless communication device 130 based upon the third delay metric. This third communication group could include timing offsets and possibly further initialization communications, or could include user or subscriber communications.

Access node 101 could transmit the third delay metric or a further delay metric to wireless communication device 130. In yet other examples, the first and second delay metrics are transferred to wireless communication device 130 for processing and determination of the third metric or a further delay metric.

During operation of communication system 100, communication system 100 exchanges communications with wireless communication device 130. During this communications exchange, communication system 100 is desired to provide reliable communications which have proper timing and synchronization. Advantageously, by utilizing a method of operation of communication system 100, as described herein, communication systems with large delays that exceed the limitations of the communication protocols can communicate effectively. This allows wireless communication devices to be more remotely located or communicate over links with larger delays than acceptable by the limitations of certain communication protocols. Also, by way of advantage, when many wireless communication devices are communicating with an access node, interferences, collisions, or other malfunctions of the communications are reduced or prevented.

Figure 3:
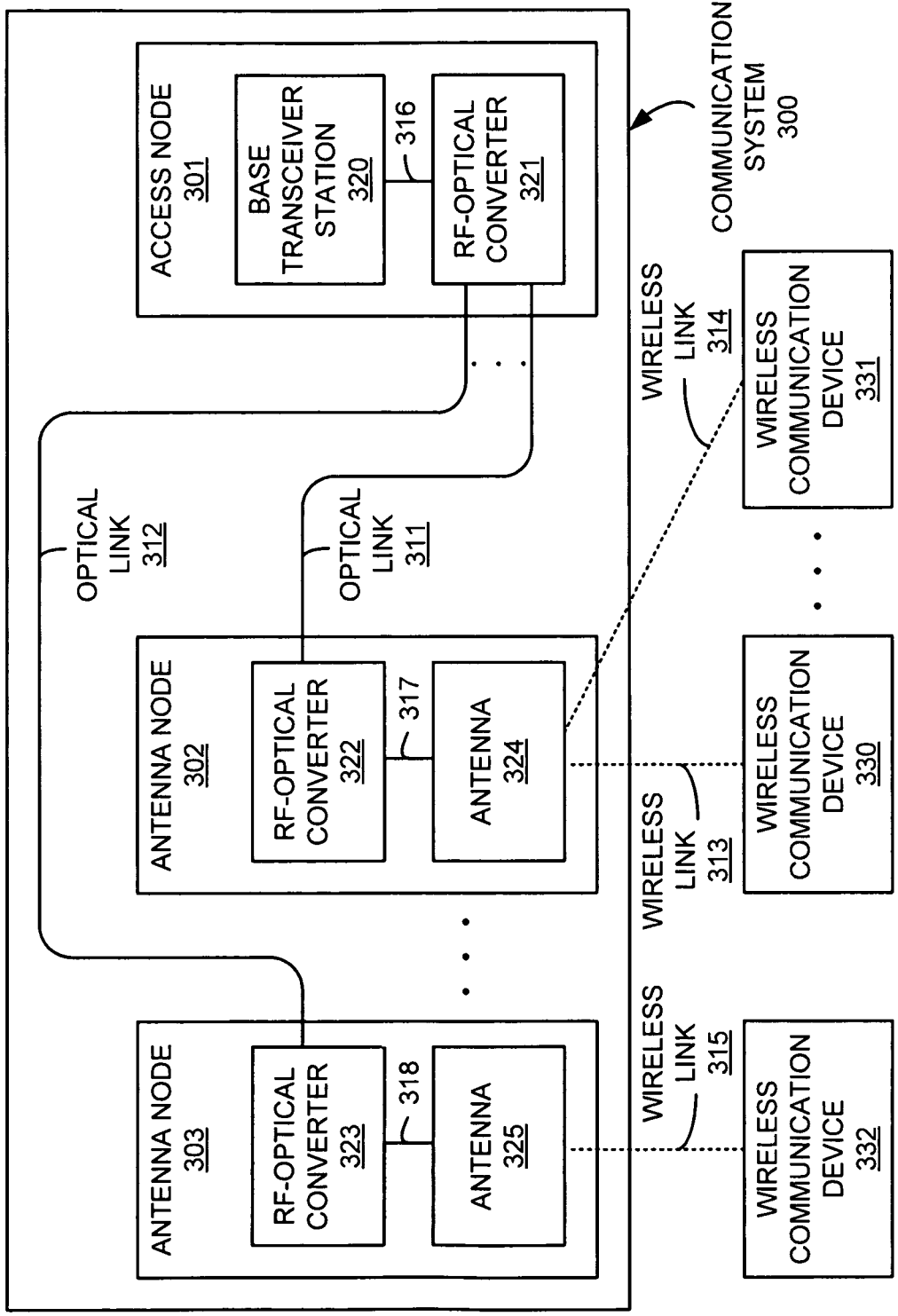
FIG. 3 is a system diagram illustrating a communication system.

FIG. 3 is a system diagram illustrating communication system 300. As shown in FIG. 3, communication system 300 includes access node 301 and antenna nodes 302 and 303. Also shown in FIG. 3 are wireless communication devices 330-332. Access node 301 and antenna node 302 communicate over optical link 311. Access node 301 and antenna node 303 communicate over optical link 312. Antenna node 302 and wireless communication device 330 communicate over wireless link 313. Antenna node 302 and wireless communication device 331 communicate over wireless link 314. Antenna node 303 and wireless communication device 332 communicate over wireless link 315.

As shown in FIG. 3, access node 301 includes base transceiver station 320 and RF-optical converter 321. Base transceiver station 320 and RF-optical converter 321 communicate over link 316. Base transceiver station 320 includes communication and processing equipment to communicate with and control antenna nodes 302 and 303 as well as wireless communication device 330-332.

RF-optical converter 321 includes equipment to convert between the signaling format of link 316 and an optical format compatible for communications over optical links 311 and 312. In the example shown in FIG. 3, base transceiver station 320 communicates over link 316 in an RF format, which could be similar to a format used by base transceiver station 320 to communicate with an antenna. For example, the RF format may could be wired or wireless and carry various protocols, such as worldwide interoperability for microwave access (WiMAX), long term evolution (LTE), time-division duplexing (TDD), orthogonal frequency-division multiplexing (OFDM) or orthogonal frequency division multiplexing access (OFDMA), wireless fidelity (WiFi), code division multiple access (CDMA), time division multiple access (TDMA), global system for mobile communications (GSM), or some other communication format, including combinations or variations thereof.

The communications format of optical links 311 and 312 is any optical communications format suitable for transferring communications over optical fiber links. In some examples, optical links 311 and 312 carry an optical version of the RF signals transferred by base transceiver station 320 over link 316. RF-optical converter 321 includes equipment to convert between the optical signals of optical links 311/312 and the format of link 316. This conversion equipment is capable of converting communications transferred in both directions through RF-optical converter 321 via link 316 and optical links 311 and 312, i.e. from RF-to-optical and from optical-to-RF.

Although two optical links 311 and 312 are shown in FIG. 3, it should be understood that a different number of optical links could be handled by RF-optical converter 321. Also, although link 316 is shown as a single line in FIG. 3, it should be understood that link 316 could be comprised of many different signals, whether separate or composite, for communication with RF-optical converter 321 and to further elements in communication system 300.

Antenna node 302 includes RF-optical converter 322 and antenna 324. Antenna node 303 includes RF-optical converter 323 and antenna 325. In some examples, antenna nodes 302 and 303 also include filters, amplifiers, and other communication equipment as well as combinations thereof. In some examples, antenna nodes 302 and 303 comprise RF heads of a distributed antenna system (DAS). A distributed antenna system (DAS) includes communication systems where the base transceiver station or access node equipment is located separately and distant from, and is coupled with, multiple antenna nodes serving a geographic area. In many of these DAS examples, the access node equipment desires to communicate over extended distances to separate antenna nodes capable of communicating with wireless communication devices over wireless links. Advantageously, a DAS incorporating features as described herein could allow for a particular geographic area to be serviced by several antenna nodes which would increase the coverage area or bandwidth capabilities of a communication system having fewer antennas or non-distant antennas.

RF-optical converter 322 includes equipment to convert between the optical format suitable for communications over optical link 311 and the signaling format of antenna 324 over link 317. RF-optical converter 323 operates in a similar fashion with respect to antenna 325 and links 312 and 318. In the example shown in FIG. 3, RF-optical converters 322/323 and antennas 324/325 communicate over links 317 and 318, respectively, in an RF format. RF-optical converters 322 and 323 could include similar equipment and functionality as described above for RF-optical converter 321, although some examples may include different or additional equipment or functionality.

Antennas 324 and 325 include antennas and equipment capable of transferring communications between antenna nodes 302/303 and wireless communication devices 330-332 over wireless links 313-315. Antennas 324 and 325 may also include further antennas, antenna arrays, filtering equipment, or other communications equipment, and combinations thereof.

Wireless communication devices 330-332 includes equipment capable of communicating with communication system 300 over wireless links 313-315. Examples of a wireless communication device include a subscriber station (SS), customer premises equipment (CPE), mobile station, telephone, transceiver, computer, digital assistant, Internet appliance, or other wireless communication apparatus, including combinations thereof. Although three wireless communication devices 330-332, are shown in FIG. 3, it should be understood that in other examples a different number of wireless communication devices could be in communication with communication system 300.

Wireless links 313-315 use various communication media, such as air, space, or some other signal propagation path, and combinations thereof. Wireless links 313-315 could use various protocols, such as worldwide interoperability for microwave access (WiMAX), long term evolution (LTE), time-division duplexing (TDD), orthogonal frequency-division multiplexing (OFDM) or orthogonal frequency division multiplexing access (OFDMA), wireless fidelity (WiFi), code division multiple access (CDMA), time division multiple access (TDMA), global system for mobile communications (GSM), or some other communication format, including combinations or variations thereof.

Figure 4:
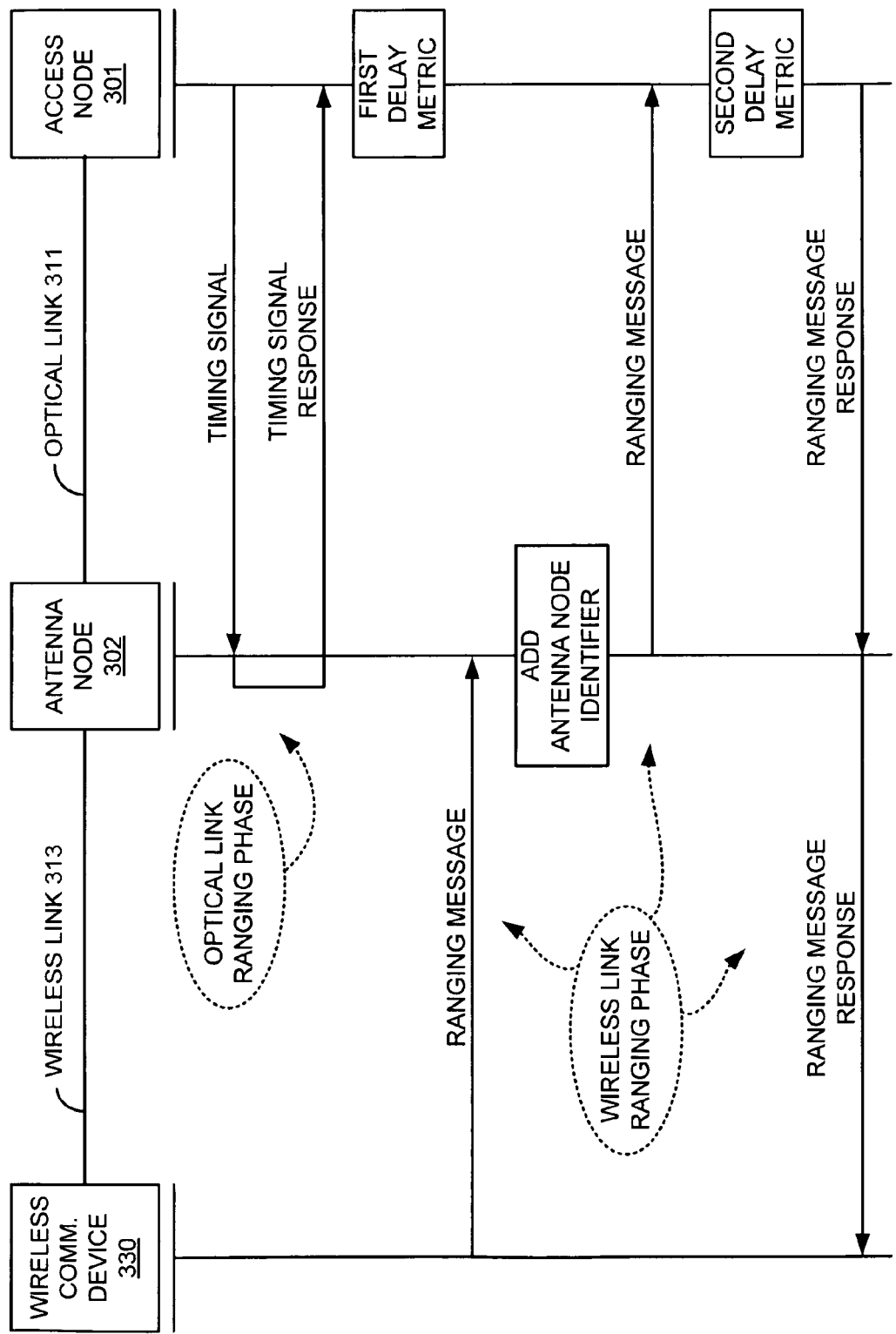
FIG. 4 is a sequence diagram illustrating a method of operation of a communication system.

FIG. 4 is a sequence diagram that shows an example sequence of operation of communication system 300 as illustrated in FIG. 3. In FIG. 4, two phases of ranging are shown: an optical link ranging phase and a wireless link ranging phase.

The optical link ranging phase includes a first communication group exchanged between access node 301 and antenna node 302 over optical link 311. As shown in FIG. 4, a portion of the first communication group is transferred from access node 301 to antenna node 302, and another portion of the first communication group is transferred from antenna node 302 to access node 301. In some examples, the portion of the first communication group transferred from antenna node 302 to access node 301 could be triggered or initiated when a portion transferred from access node 301 is received in antenna node 302. In yet other examples, antenna node 302 processes a portion of the first communication group received from access node 301 to determine the content or timing of the portion transferred to access node 302.

As shown in FIG. 4, this first communication group could include a timing signal transferred from access node 301 to antenna node 302. This timing signal is received in antenna node 302 and a timing signal response is transferred to access node 301. In some examples, this timing signal is used to gauge a round-trip or one-way signal transmission delay between access node 301 and antenna node 302 over optical link 311. The timing signal response, in some examples, needs to be transferred within a short time of the receipt of the timing signal from access node 301, and may be an electrical or optical reflection or other propagation delay measurement. In other examples, the timing signal is processed by antenna node 302, and the timing signal response includes timing information that access node 301 could use to determine a first delay metric.

At least a portion of the first communication group is then processed by access node 301 to determine a first delay metric. The first delay metric could, for example, represent a time delay of communications transferred over optical link 311 between access node 301 and antenna node 302. In other examples, the first delay metric could be determined by processing a round trip delay or one-way transmission delay of the first communication group between access node 301 and antenna node 302. The first delay metric may also include delays associated not only with optical link 311 but also delays associated with circuitry within access node 301 and antenna node 302. The optical link ranging phase for communications between access node 301 and antenna node 303 over optical link 312 could occur in a similar manner as described above for optical link 311.

The optical link ranging phase could occur during the setup, construction, or initialization of communication system 300. The optical link ranging phase could also occur periodically throughout operation of communication system 300, for example, to compensate for temperature or electromagnetic transient effects on the first delay metric. Additionally, information regarding the timing delays or first delay metrics for each antenna node in a communication system could be stored for later reference in access node 301, in some examples.

The wireless link ranging phase includes a second communication group exchanged between access node 301 and wireless communication device 330 over optical link 311 and wireless link 312. As shown in FIG. 4, this second communication group is transferred between wireless communication device 330 and access node 301 by way of antenna node 302. In some examples, a portion of the second communication group is transferred from wireless communication device 330 to access node 301, and another portion of the second communication group is transferred from access node 301 to wireless communication device 330.

The second communication group could include a ranging process of wireless link 312 to adjust the communication timing, power, frequency tuning, burst profile, or other parameters of communications of communication system 300 with wireless communication device 330. This ranging process could include ranging messages or ranging channels; CDMA, OFDM or OFDMA frames or symbols; or other communication and ranging elements.

This ranging process could be an initial ranging process, an invited ranging process, or a periodic ranging process. In examples of initial ranging, wireless communication device 330 initiates transfer of a portion of the second communication group when initializing communications with access node 301. In examples of invited ranging, a portion of the second communication group transferred from wireless communication device 330 to access node 301 could be triggered when a portion transferred from access node 301 is received at wireless communication device 330. In other examples of invited ranging, wireless communication device 330 processes a portion of the second communication group received from access node 301 to determine what to transfer to access node 301. In examples of periodic ranging, the ranging process is conducted on a timed or regular basis, initiated when a portion of the second communication group is transferred to wireless communication device 330 or by way of a timing mechanism internal to access node 301 to initiate the ranging process after a certain period of time.

The wireless link ranging phase example shown in FIG. 4 includes a ranging message as part of an initial ranging process. This wireless link ranging phase begins with an initial ranging message being transferred from wireless communication device 330 to antenna node 302 over wireless link 313. This initial ranging message could be initiated when wireless communication device 330 desires to initiate communications with access node 301 and, in some examples, transferred after wireless communication device 330 monitors control and status communications periodically broadcast by access node 301. In some WiMAX examples, the initial ranging message could also be transferred in response to a reference symbol or signal timing determined by access node 301. In other examples, this ranging message is part of an invited or periodic ranging procedure instead initiated by access node 301.

Once the ranging message transferred by wireless communication device 301 is received in antenna node 302, an identifier could be added to the ranging message. This identifier would be used to identify antenna node 302 through which communications are transferred between wireless communication device 330 and access node 301. In communication system examples with only one antenna node, the identifier could be neglected, while in communication system examples with many antenna nodes, the identifier allows an access node to identify the antenna node or optical link over which communications with the various wireless communication devices are transferred. In other examples, access node 301 or RF-optical converter 321 could instead determine optical link 311 or antenna node 302 over which communications are received.

Antenna node 302 then transfers the ranging message over optical link 311 to access node 301. This ranging message could have been modified as described above to include an identifier of antenna node 302.

Access node 301 processes at least a portion of the second communication group, or ranging message as shown in FIG. 4, to determine a second delay metric. The second delay metric could, for example, represent a composite time delay of communications transferred between access node 301 and wireless communication device 330 over links 311 and 312. The second delay metric could be determined, for example, by processing a round trip delay or one-way transmission delay of the second communication group between access node 301 and wireless communication device 330. Additionally, when multiple antenna nodes exchange communications with access node 301, as shown in FIG. 3, for example, an identifier or identifying means is used by access node 301 to determine over which optical link or through what antenna node the ranging message is transferred. This is done to correlate the first delay metric to a specific antenna node or optical link, to allow for correct determination of a third delay metric.

Access node 301 then processes the first delay metric and second delay metric to determine a third delay metric. This third delay metric is determined from the first delay metric and second delay metric, as well as any limitations of the communication protocol used between access node 301 and wireless communication device 330. For example, in many communication protocols, a maximum time delay is allowed between two points in a communication link. This time delay can limit the maximum distance, interconnect quality, number of repeaters, number and delay of interconnecting equipment, or operating speed of two points in a communication link.

For example, regarding the timing delay provisions of some protocols, communications between access nodes and wireless communication devices can include framed communications. In some WiMAX examples, such as time-division duplexing (TDD), multiple wireless communication devices communicating with a single access node share the same communication channel, and timing offsets play an important role in the communications. The timing offsets indicate to the wireless communication devices when to transmit communications, and likewise can indicate to access nodes when to expect receipt of communications from wireless communication devices. If these timing delays are incorrect, more specifically in examples where many wireless communication devices are communicating with an access node, then interferences, collisions, or other malfunctions of the communications could result.

Communication protocols, in some examples, accommodate only limited timing offset adjustment provisions. The provisions for timing offsets in such examples can reach a maximum allowable value if the transmission delay between an access node and a wireless communication device becomes too large. This transmission delay can become large, for example, if there are long cable lengths or wireless transmission distances over which the communications must travel.

In examples where the transmission delay becomes too large to be accommodated by the limitations of the communication protocol, the third delay metric could include both a timing offset within the individual elements of the communications as well as a delay in total communications In some examples, the timing offset of the individual elements includes a timing offset to delay transmission of portions (such as symbols or possibly frames) of the communication protocol, which could reach a maximum allowable timing offset as discussed above. The delay in total communications could include an integer number of symbols or frames by which to adjust the timing in communications. This timing adjustment could further indicate a delay in communications or a delayed receipt of communications.

In communication system 300, for example, multiple antenna nodes and wireless communication devices are involved in communication with access node 301. Identifiers for the wireless communication devices and antenna nodes could be used to correlate the various delay metrics to the appropriate wireless links and optical links. In this manner, communications between each wireless communication device and access node 301 are handled with correct third delay metrics and timing offsets as determined herein.

In some examples, the third delay metric is determined by comparing the second delay metric to the first delay metric while considering the timing offset limitations of the communication protocol. In some WiMAX examples, if the timing offset limitations for a particular reference symbol are exceeded, then the third delay metric could incorporate added reference symbols. These reference symbols are similar to protocol timing periods in other example communication protocols.

In other examples, the third delay metric is determined by processing the second delay metric with the first delay metric and a protocol timing period to determine a fourth delay metric. This fourth delay metric could indicate a fourth time delay associated with the wireless link portion of the communication links between the access node and wireless communication device. An integer quantity of the protocol timing periods could be processed and added to the fourth delay metric to determine the third delay metric. Further examples are discussed below regarding FIGS. 5A/5B.

Once the third delay metric has been determined, communication system 300 times a third communication group between access node 301 and wireless communication device 330 based upon the adjustments of the third delay metric. This third communication group could include further timing offsets, initialization communications, or could include user or subscriber communications. As a portion of the third communication group, access node 301 could transmit the third delay metric or a further delay metric to wireless communication device 330 in a ranging response message. In yet other examples, the first and second delay metrics are transferred to wireless communication device 330 for processing and determination of the third metric or a further delay metric.

The wireless link ranging phase for communications between access node 301 and wireless communication devices 331 and 332 over their respective wireless and optical links could occur in a similar manner as described above for wireless communication device 330.

In operation of communication system 300, communication system 300 exchanges communications with wireless communication devices 330-332. During this communications exchange, communication system 300 desires to provide reliable communications which have proper timing and synchronization. Advantageously, by utilizing a method of operation, as described herein, to adjust the timing of communications of communication system 300, systems with large delays that exceed the provisions of the communication protocols can communicate effectively. This allows wireless communication devices to be more remotely located or communicate over links with larger delays than acceptable by the limitations of certain communication protocols. Also, by way of advantage, when many wireless communication devices are communicating with an access node, interferences, collisions, or other malfunctions of the communications are reduced or prevented.

As found in some WiMAX protocol examples, such as typically found in time-division duplexing (TDD) examples, wireless communication devices communicating with an access node share a similar communication channel in a time-wise fashion, and timing offsets play an important role in the communications. In many TDD examples, a specific period of transmission time is typically allocated for each wireless communication device in communication with an access node. In such examples, a ranging process is typically used to adjust communication timing, power, frequency tuning, burst profile, or other parameters of communications between the wireless communication devices and the access node.

During an exemplary ranging process, such as between wireless communication device 330 and access node 301 found in FIG. 3, a delay between a ranging message received at access node 301 and a reference symbol associated with the ranging message is detected by access node 301 and processed into a timing offset. This timing offset could then be used to facilitate communications between access node 301 and wireless communication device 330, and vice versa, by compensating for some timing delays over communication links 111 and 112.

However, only limited timing offset provisions exist in many example protocols, including the WiMAX examples mentioned, which limit the maximum communication delays over communication links. These maximum communication delays can, for example, limit the length of interconnecting communication links, the amount or type of interconnecting equipment, as well as the geographic distance a wireless communication device can be away from an access node.

In some TDD examples, a series of reference symbols is transferred by an access node and used to coordinate the timing of ranging messages among multiple wireless communication devices sharing a similar communication channel. These reference symbols provide a period of time by which each wireless communication device initiating communication with the access node can use to time ranging messages, and likewise when the access node should expect receipt of the ranging messages. However, if communication delays between a wireless access device and its associated access node become too large, the access node may become less able to distinguish communications among many wireless communication devices. Collisions, interferences, or malfunctions of communications among the various wireless communication devices can result.

FIG. 5A provides a graphical representation of ranging message 510A between access node 301 of FIG. 3 and wireless communication device 330 associated with access node 301 over communication links 311/313, assuming for this example, a short delay. In FIG. 5A, the ranging process is facilitated by a continual series of reference symbols, four of which are explicitly shown, 501R1-501R4. Each reference symbol 501R1-501R4 is encountered serially, with each reference symbol 501R1-501R4 representing a predetermined period of time.

In FIG. 5A, wireless communication device 330 initiating communication with access node 301 over short communication links 311/313, for example, would monitor the series of reference symbols transferred by access node 301. In response to a particular reference symbol, 501R1, the wireless communication device 330 transfers a ranging message 510A. Short delays in communication links 311/313 between access node 301 and wireless communication device 330 would delay the receipt of reference symbol 501R1 (transferred by access node 301) in wireless communication device 330 and likewise delay the receipt of ranging message 510A (transferred by wireless communication device 330) in access node 301. This is represented by communication delay 520TA. Communication delay 520TA is an amount of time by which ranging message 510A is delayed in arrival at access node 301 with regards to the transfer of reference symbol 501R1. Since ranging message 510A arrives at access node 301 within the period of reference symbol 501R1, access node 301 properly receives ranging message 510A and correlates ranging message 510A with reference symbol 501R1.

To help compensate for communication delay 520TA, access node 301 could adjust the timing of communications with wireless communications device 330 by processing communication delay 520TA. However, access node 301 would be limited in this adjustment by the timing offset provisions of the particular protocol used, and thus only a short communications delay would be acceptable. In some examples, this timing offset could be transferred to wireless communication device 330 and used to delay communications with access node 301.

FIG. 5B provides a graphical representation of ranging message 510B between access node 301 of FIG. 3 and wireless communication device 332 associated with access node 301 over communication links 312/315, assuming for this example, a long delay. In FIG. 5B, the ranging process is facilitated by a continual series of reference symbols, four of which are explicitly shown, 502R1-502R4. Each reference symbol 502R1-502R4 is encountered serially, with each reference symbol 502R1-502R4 representing a predetermined period of time.

In FIG. 5B, wireless communication device 332 initiating communication with access node 301, for example, would monitor the series of reference symbols transferred by access node 301. In response to a particular reference symbol, 502R1, wireless communication device 332 transfers ranging message 510B. Long delays in communication links 312/315 between access node 301 and wireless communication device 332 would delay the receipt of reference symbol 502R1 (transferred by access node 301) in wireless communication device 332 and likewise delay the receipt of ranging message 510B (transferred by wireless communication device 332) in access node 301. This is represented by communication delay 520TB, an amount of time by which ranging message 510B is delayed in arrival at access node 301. However, unlike in FIG. 5A, ranging message 510B does not arrive at access node 301 within the period of one reference symbol 502R1, and access node 301 would not properly correlate ranging message 510B with reference symbol 502R1. Instead, ranging message 510B arrives at access node 301 within the time period of reference symbol 502R2. This can lead to confusion on which reference symbol is correlated with ranging packet 510B, further leading to interference, collision, or malfunction of other ranging packets on similar channels, as well as make access node 301 believe that ranging message 510B is correlated with a different reference symbol, for example reference symbol 502R2, instead of 502R1.

In the above discussions on delay, it should be understood that a 'short' delay would be a delay acceptable by the timing offset provisions of the particular communications protocol, while a 'long' delay would be a delay exceeding the timing offset limitations of the communication protocol.

In some examples of the third delay metric, as discussed herein, if the delays found in communication links 312/315 are greater than limits within the timing provisions of the communication protocol, access node 301 could correlate a different reference symbol to the communications received in access node 301 from wireless communication device 332. In such examples, the particular reference symbol could be determined by processing the delays associated with each of the communication links 312/315 over which wireless communication device 332 and access node 301 communicate. This processing could also be done in view of the timing offset limitations of the particular protocol to adjust the timing of communications over the communication links 312/315.

In an example, if the communication delay of a ranging packet sent by wireless communication device 332 exceeds a fraction of the timing offset provisions of the communication protocol, then a later reference symbol could be correlated to the communications with wireless communication device 332. A two-part delay metric could then be determined, with a first part being a portion of the communication delay attributed to the later reference symbol, and a second part being a portion of the communication delay attributed to the remaining timing offset not exceeding the above fraction of the timing offset provision of the communication protocol. In some examples, the fraction could be one-half (½) of the timing offset provisions of the communication protocol. Furthermore, in some examples, the first part of the two-part delay metric could be utilized by access node 301 to adjust the expectation time of arrival of communications from wireless communication device 332, and the second part of the two-part delay could be transferred to wireless communication device 332 and used to delay communications transferred to access node 301. In other examples, different configurations of the delay metric could be utilized.

FIG. 6 illustrates a block diagram of access node 101, as found in FIG. 1. Access node 101 includes communication interface 650 and processing system 660. Processing system 660 includes storage system 661. Storage system 661 stores software 662, which includes data to be retrieved and instructions to be executed by processing system 660 to perform the various functions described herein. Processing system 660 is communicatively linked to communication interface 650 by link 651. Access node 101 may be distributed among multiple devices that together form elements 650, 651, 660-662. Communication interface 650 comprises a base transceiver station, antennas, transceivers, RF-optical converters, circuitry, as well as other types of communication equipment—including combinations thereof.

Processing system 660 retrieves and executes software 662 from storage system 661. Processing system 660 could incorporate a computer microprocessor, logic circuit, or some other processing device, and may be distributed among multiple processing devices. In some examples, processing system 660 is located within the same equipment in which communication interface 650 is located. Storage system 661 could include a computer-readable medium such as a disk, tape, integrated circuit, server, or some other memory device, and also may be distributed among multiple memory devices. Software 662 may include an operating system, logs, utilities, drivers, networking software, and other software typically loaded onto a computer system. Software 662 could contain an application program, firmware, or some other form of computer-readable processing instructions. When executed by processing system 660, software 662 directs processing system 660 to operate as described herein.

Link 651 comprises a physical, logical, or virtual communication link between communication interface 650 and processing system 660, capable of communicating service control signals and communications, along with other information. In some examples, link 651 is encapsulated within the elements of communication interface 650 or processing system 660 and may be a software or logical link. In other examples, link 651 uses various communication media, such as air, space, metal, optical fiber, or some other signal propagation path—including combinations thereof. Link 651 could be wired or wireless and use various protocols or communication formats including those described for link 111—including combinations or variations thereof. Link 651 could be a direct link or it might include various equipment, intermediate components, systems, and networks.

FIG. 7 illustrates a block diagram of antenna node 102, as found in FIG. 1. Antenna node 102 includes communication interface 750 and identifier module 760. Identifier module 760 is communicatively linked to communication interface 750 by link 751. Antenna node 102 may be distributed among multiple devices that together form elements 750, 751, and 760. Communication interface 750 comprises antennas, RF-optical converters, circuitry, as well as other types of communication components—including combinations thereof.

Identifier module 760 comprises circuitry, storage or memory devices, a computer system, or other types of circuitry or processing equipment used to identify antenna node 102 in communications handled by communications interface 750.

Link 751 comprises a physical, logical, or virtual communication link between communication interface 750 and identifier module 760. In some examples, link 751 is encapsulated within the elements of communication interface 750 or processing system 760 and may be a software or logical link. In other examples, link 751 uses various communication media, such as air, space, metal, optical fiber, or some other signal propagation path—including combinations thereof. Link 751 could be a direct link or it might include various equipment, intermediate components, systems, and networks.

FIGS. 1-7 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An access node for a communication system, comprising:
    a communication interface configured to exchange communications with an antenna node over a first link; and
    a processing system configured to determine a first round trip delay of a communication over the first link,
    wherein the communication interface is further configured to exchange communications with a wireless communication device over a second link, the second link comprising the first link and a third link, the third link comprising a link between the antenna node and the wireless communication device,
    wherein the processing system is further configured to determine a second round trip delay of a communication over the second link and process the first round trip delay and the second round trip delay to calculate an access node timing offset based on the first round trip delay and the second round trip delay when the second round trip delay is larger than a predetermined maximum protocol timing offset, wherein the access node timing offset comprises a timing delay of a transmission of symbols in a communication over the second link, and the access node timing offset is larger than the predetermined maximum protocol timing offset; and
    wherein the communication interface is further configured to transmit a downlink communication to the wireless communication device through the second link, and receive an uplink communication from the wireless communication device through the second link, wherein the uplink communication is received according to the access node timing offset.

2. The access node of claim 1, wherein the communication interface comprises a base transceiver station coupled to an RF optical converter, and wherein the first link comprises an optical link.

3. The access node of claim 1, wherein the communication interface is further configured to:
    transmit a downlink communication to the wireless communication device through the second link; and
    receive an uplink communication from the wireless communication device through the second link, wherein the uplink communication is received according to the access node timing offset.

4. The access node of claim 1, wherein
    the processing system is further configured to calculate a wireless communication device timing offset based on the first round trip delay and the second round trip delay, when the second round trip delay is larger than a predetermined maximum protocol timing offset, and
    the communication interface is further configured to:
        transmit a downlink communication to the wireless communication device through the second link comprising the wireless communication device timing offset; and
        receive an uplink communication from the wireless communication device through the second link according to the access node timing offset and the wireless communication device timing offset.

5. The access node of claim 3, wherein calculating an access node timing offset comprises:
    processing the second round trip delay with the first round trip delay and a protocol timing period to determine a third round trip delay, wherein the third round trip delay indicates a delay associated with the third link; and
    adding an integer quantity of the protocol timing periods to the third round trip delay.

6. The access node of claim 3, wherein
    the processing system is further configured to associate the access node timing offset with an identifier of the antenna node, and
    the communication interface is further configured to determine that the uplink communication is received through the second link based on the identifier of the antenna node.

7. An antenna node for a communication system, comprising:
    a communication interface configured to:
        receive a timing signal from an access node over a first link;
        transfer a response to the timing signal over the first link to determine a first round trip delay associated with transmission over the first link;
        receive a first communications from the access node over the first link; and
        transfer the first communications to a wireless communication device over a second link; and
    an identifier module configured to determine an identifier of the antenna node and transfer the identifier of the antenna node,
    wherein the communication interface is further configured to receive a second communications from the wireless communication device over the second link and transfer a third communications to the access node over the first link to determine a second round trip delay associated with the first link and the second link, wherein the third communications comprises the second communications and the identifier of the antenna node, and
    wherein the communication interface is further configured to receive from the access node a fourth communications, to transfer the fourth communications to the wireless communication device over the second link, and to receive a fifth communications from the wireless communication device over the second link, wherein the fifth communications is timed according to a transmission timing delay and an access node timing offset based on the first round trip delay and the second round trip delay.

8. The antenna node of claim 7, wherein the response to the timing signal comprises an indicator of the time the timing signal was received by the antenna node.

9. The antenna node of claim 7, wherein the communication interface comprises:
    an RF-optical converter coupled to the first link, wherein the first link comprises an optical link; and
    an antenna coupled to the second link, wherein the second link comprises a wireless link.

10. A method of operating a communication system, the method comprising:

determining, at an access node of the communication system, a first round trip delay comprising a round trip delay of a communication over a first link, the first link comprising a link between the access node and an antenna node of the communication system;

determining a second round trip delay comprising a round trip delay of a communication over a second link, the second link comprising the first link and a third link, the third link comprising a link between the antenna node and a wireless communication device; and calculating an access node timing offset based on the first round trip delay and the second round trip delay, when the second round trip delay is larger than a predetermined maximum protocol timing offset, wherein the access node timing offset comprises at least one protocol timing period, and wherein the access node timing offset is larger than the predetermined maximum protocol timing offset;

transmitting a downlink communication to the wireless communication device through the second link; and receiving an uplink communication from the wireless communication device through the second link, wherein the uplink communication is received according to the access node timing offset.

11. The method of operating the communication system of claim 10, wherein calculating an access node timing offset based on the first round trip delay and the second round trip delay comprises:

processing the second round trip delay with the first round trip delay and a protocol timing period to determine a third round trip delay, wherein the third round trip delay indicates a delay associated with the second link;

adding an integer quantity of the protocol timing periods to the third round trip delay.

12. The method of operating the communication system of claim 10, wherein the protocol timing period is a reference symbol of a WiMAX communication protocol.

13. The method of operating the communication system of claim 10, wherein the access node comprises a base transceiver station and an RF-optical converter and wherein the first link comprises an optical link.

14. The method of operating the communication system of claim 10, wherein the antenna node comprises an RF-optical converter and an antenna, wherein the first link comprises an optical link, and wherein the second link comprises a wireless link.

15. The method of operating the communication system of claim 10, wherein the second communications comprise a WiMAX ranging message.

16. The method of operating the communication system of claim 10, further comprising associating the access node timing offset with an identifier of the antenna node, wherein the uplink communication further comprises the identifier of the antenna node.

17. The method of operating the communication system of claim 10, further comprising:

calculating a wireless communication device timing offset based on the first round trip delay and the second round trip delay, when the second round trip delay is larger than a predetermined maximum protocol timing offset; and transmitting a downlink communication to the wireless communication device through the second link comprising the wireless communication device timing offset; and receiving an uplink communication from the wireless communication device through the second link, wherein the uplink communication is received according to the access node timing offset and the wireless communication device timing offset.

* * * * *